(12) United States Patent
Eile et al.

(10) Patent No.: US 6,755,936 B2
(45) Date of Patent: Jun. 29, 2004

(54) HEAT SEALER

(75) Inventors: John Eile, Baldwin, NY (US); Robert Kops, Bayshore, NY (US)

(73) Assignee: EZ-Tek Industries, Inc., Deer Park, NY (US)

( * ) Notice: Subject to any disclaimer, the term of this patent is extended or adjusted under 35 U.S.C. 154(b) by 64 days.

(21) Appl. No.: 10/091,053

(22) Filed: Mar. 5, 2002

(65) Prior Publication Data

US 2003/0168162 A1 Sep. 11, 2003

(51) Int. Cl.$^7$ .............................................. B30B 15/00
(52) U.S. Cl. .................... 156/583.1; 156/358; 156/359; 156/366
(58) Field of Search ....................... 156/64, 228, 308.2, 156/358, 359, 366, 580, 581, 583.1

(56) References Cited

U.S. PATENT DOCUMENTS

| | | | |
|---|---|---|---|
| 4,421,589 A | * | 12/1983 | Armini et al. ............... 156/382 |
| 4,743,333 A | * | 5/1988 | Forthmann ................... 156/359 |
| 5,225,025 A | * | 7/1993 | Lambing et al. ............ 156/358 |
| 6,053,230 A | | 4/2000 | Pelland |
| 6,092,578 A | * | 7/2000 | Machida et al. ............ 156/358 |

* cited by examiner

*Primary Examiner*—James Sells
(74) *Attorney, Agent, or Firm*—Keusey, Tutunjian & Bitetto, P.C.

(57) ABSTRACT

A heat sealer includes a base configured to be mounted on a tabletop, a first jaw connected to the base, and a second jaw operatively aligned with the first jaw. An actuator is coupled to the second jaw to provide relative motion with respect to the first jaw. A heating device is coupled to the first and second jaws for heating the jaws to a set temperature to enable material to be contacted and welded when the first and second jaws are in a closed position.

31 Claims, 8 Drawing Sheets

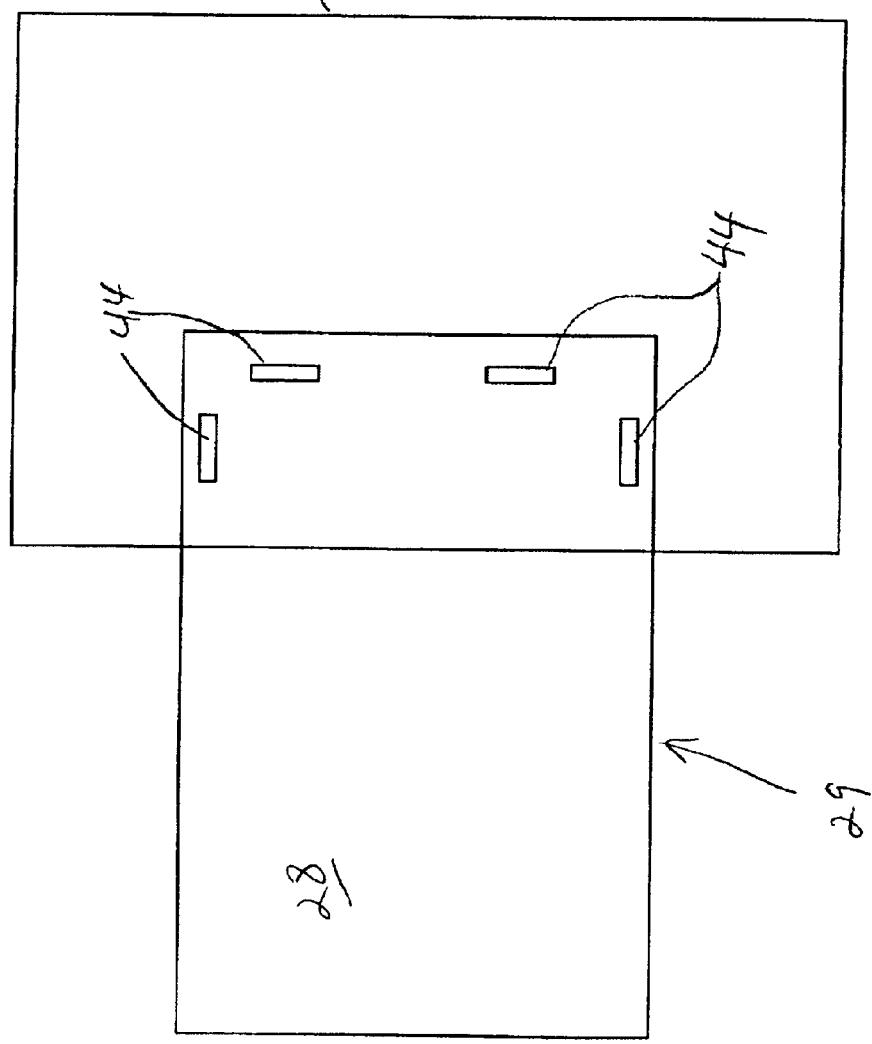

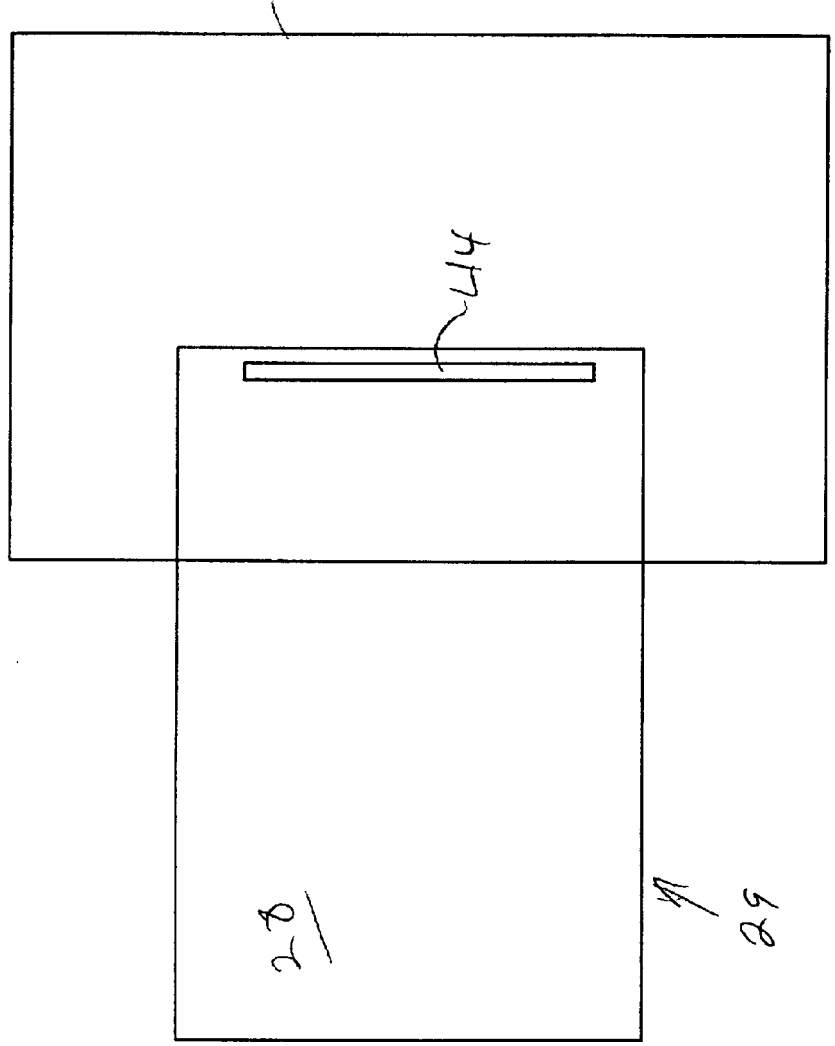

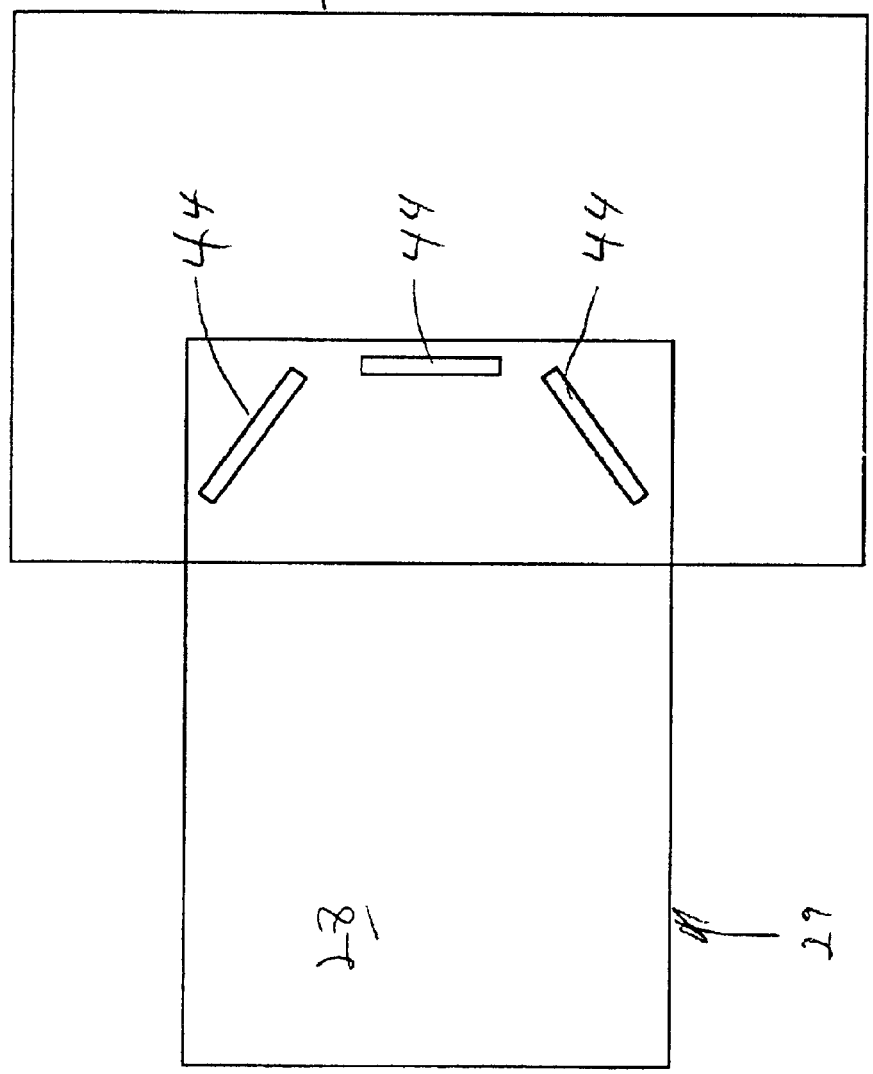

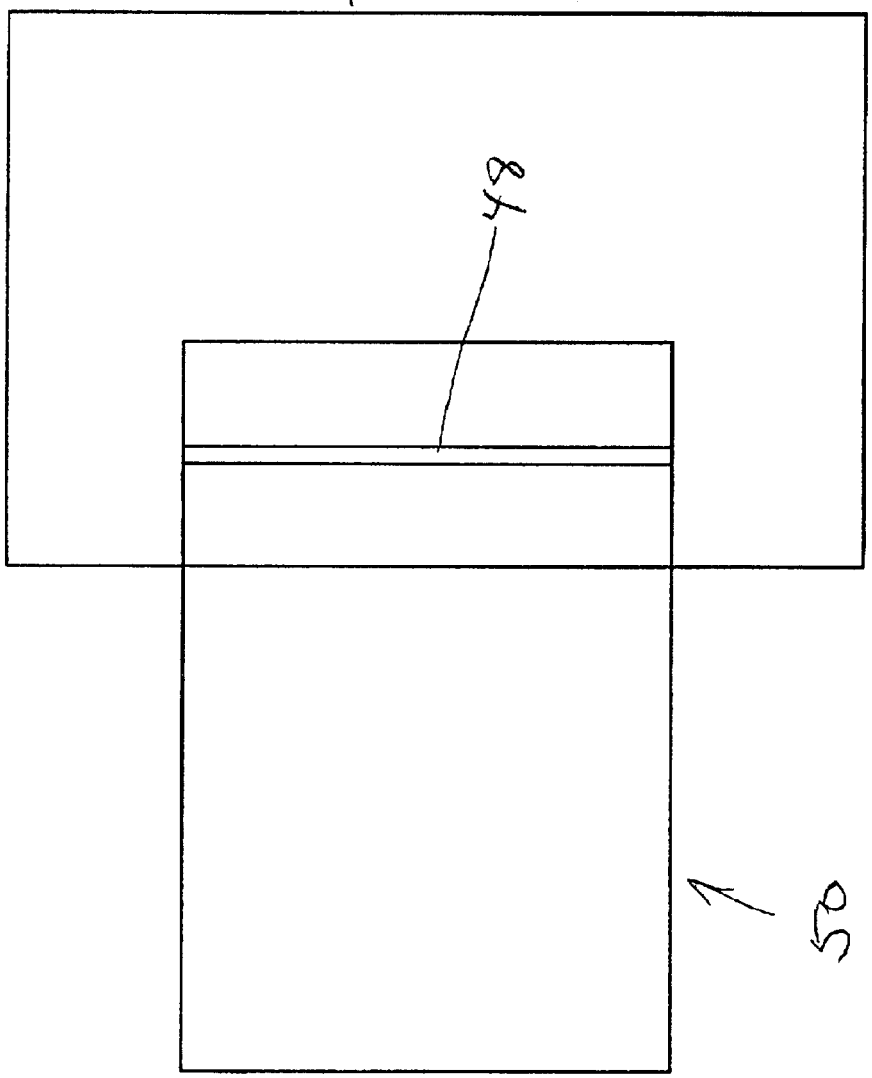

HEAT SEALER

BACKGROUND

1. Technical Field

This disclosure relates to product packaging devices, and more particularly, to a heat sealer device which provides for easier sealing of clam shell-type plastic packages.

2. Description of the Related Art

One important aspect of manufacturing products includes the packaging in which the product is shipped and presented for sale. The packaging in which a product is placed needs to be secure enough to prevent unwanted tampering of the product. In addition, packaging is functional as well. For example, in many applications the packaging provides protection during shipping and during display of the items in for example a store. Packaging further serves to provide promotional aspects for the packaged item. Packaging can be for example, clear to show the packages item or colored to enhance the appeal of the product.

One important type of packaging includes clamshell packaging where a thermoplastic material is preformed to the basic shape of the item or product to be packaged. The item is then packaged by placing the item in the clamshell and closing the two halves of the clamshell over the package. The clamshell is preferably sealed by a heat-sealing process.

There are four main methods of heat sealing or welding presently in use: hot wedge, radio frequency ("RF"), ultrasonic, and hot air. In the hot wedge method, two fabric pieces are drawn across a hot iron (or wedge) and then are pressed together. This method may be performed by hand held press-type tools. These tools lend themselves to laborer injuries, such as carpal tunnel syndrome problems or other hand injuries, during repeated use. In addition, operators vary and the quality of the seal depends on the operator and the operator's present condition. This introduces a large amount of variability in the packaging process.

The hot wedge method is quite similar to the hot air process with only the heat delivery system being different. Another disadvantage of this method is that the wedge can become contaminated with dirt and melted plastic which then reduces the amount of heat delivered to the seam. Further, hot wedge welders typically experience a hot section immediately after the beginning of the weld as the wedge accumulates excess heat when idle. Another disadvantage is that, since the heat energy must pass through a solid object to reach the seam, the maximum speed of the hot wedge welding process is limited by the thermal conductivity of the wedge.

The RF method is probably the most widely used approach for heat sealing. The RF welder is basically an antenna (the die) that is poorly matched to the amplifier, thereby producing a great deal of heat rather than radio waves between the antenna and the underlying plate. In practice, the two fabric pieces are laid on the plate. The die is then brought down, thereby pressing the two pieces together. The operator then initiates the welding process by pressing a pair of push buttons. The actual RF process takes from about 5 to 15 seconds, depending upon the thickness of the pattern pieces and the amount of RF energy available from the machine.

There are, however, several disadvantages to the RF method. RF welding is a slow process because the size of the die is limited by the available energy of the unit. Typical RF welding dies are about 1 to 3 feet in length and approximately ½ inch wide. There is also some concern about the operator's health and safety as the operator is usually inches from an intense RF source which may be activated several hundred times in a typical shift. While RF health hazards have not been documented, it is known that stray RF energy from such machines can damage electrical equipment within approximately 50 feet of the machine and can light fluorescent fixtures located nearby. In addition, due to the die and plate arrangement, the RF method is typically limited to seams or joints that can be laid flat for welding. Three-dimensional dies and plates are occasionally used, but are quite expensive and require a vacuum or other methods to hold the fabric in position as the die is applied. Further, the Federal Communications Commission ("FCC") has become increasingly strict regarding emissions of stray RF energy from industrial sources. Because of the increasingly strict FCC regulations, new RF welding equipment can typically cost $80,000 or more.

Ultrasonic welding is a process that is like RF welding, with the exception of the energy source. Rather than using radio waves, ultrasonic welding uses sound waves that basically vibrate the fabric molecules until sufficient heat is generated to melt the coatings.

In general, hot air welding is much faster than other methods, can accommodate three-dimensional patterns, and requires no dies or tooling. In a hot air welder, the flow of hot air that floods the seam is not subject to contamination, as with the wedge welder, and there is no initial drop off of heat at the beginning of the seam. Most fabricators want the speed of hot air technology, but have felt that it is difficult to obtain consistent results for many types of coated fabrics and also that it requires highly trained operators.

The typical rotary hot air welding apparatus uses hot air to join together two pieces of plastic coated fabric. The welder first injects a stream of hot air from a hot air nozzle between the two pieces of coated fabric. The temperature of the hot air can be set in the range of approximately 500 to 1350 degrees F. The fabric pieces are then pinched between and pulled through the apparatus by two drive wheels. The distance from the hot air nozzle and the pinch point between the two wheels is in the range of approximately 0.5 to 0.75 inch. The wheel speed determines how long the fabric is exposed to the hot air stream before it passes between the wheels. With a constant air temperature, the amount of heat energy delivered to the fabric is inversely proportional to the wheel speed; a faster speed decreases the exposure and vice versa.

Commercial hot air welders currently available on the market have a number of shortcomings. One shortcoming is the lack of accurate control of the speed of the two drive wheels. If the wheel speed varies from the required speed, then the amount of heat delivered to the seam will vary. Too much heat supplied to the weld results in burnt fabric while too little heat results in cold welds or unwelded fabric.

Therefore, a need exists for a heat sealer device that provides reliable and fast heat welds without the dangerous effects and expense of the prior art techniques. A further need exists for an easily operated apparatus that provides a consistent weld for a repeated manufacturing process.

SUMMARY OF THE INVENTION

A heat sealer includes a base configured to be mounted on a tabletop, a first jaw connected to the base, and a second jaw operatively aligned with the first jaw. An actuator is coupled to the second jaw to provide relative motion with respect to the first jaw. A heating device is coupled to the first and second jaws for heating the jaws to a set temperature to enable material to be contacted and welded when the first and second jaws are in a closed position.

Another embodiment of the heat sealer is employed for clamshell packages. The heat sealer includes a base configured to be mounted on a tabletop, a first jaw connected to the base, and a second jaw operatively aligned with the first jaw. An actuator is coupled to the second jaw to provide relative motion with respect to the first jaw. A heating device is coupled to the first and second jaws for heating the jaws to a set temperature to enable material to be contacted and welded when the first and second jaws are in a closed position. A casing is coupled to the base and encloses at least the first and second jaws and the heating device to prevent casual operator contact with the first and second jaws and the heating device.

In alternate embodiments of the present invention, the first jaw and the second jaw may include a non-stick liner. The actuator may be coupled to a guide rod to provide a controlled displacement between the first jaw and the second jaw. The sealer may include a timing device, which measures a time in which the first and second jaws are in the closed position. The sealer may include a pressure sensor, which measures the pressure and adjusts the actuator accordingly. The heating device is preferably controlled by feedback from a temperature measurement device. The sealer may include a sensor operatively positioned relative to the first jaw and the second jaw to sense a position of a clamshell package relative to the first and second jaws. The sensor preferably triggers the actuator to close the first and second jaws. The casing may include a guide which enables a clamshell package to be aligned with and disposed between the first and second jaws. The sealer may include a memory, which stores a plurality of settings combinations for different clamshell packages. The actuator may be coupled to a mechanism which simultaneously provides a rotational and translations motion to the first jaw.

A method for sealing a workpiece, includes the steps of configuring a heat sealer by adjusting at least one of temperature, pressure and engagement time of jaws, placing a package in the sealer by presenting one side of the package to be sealed into the sealer, and closing jaws of the sealer to engage the package in a hands-free weld operation. The method may also include the step of adjusting a trigger sensor, which triggers the jaws to close.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIGS. 3A–C show different illustrative weld/seal patterns which can be provided in accordance with the present invention;

FIG. 3D illustratively shows a bag sealed with the present invention;

DETAILED DESCRIPTION OF PREFERRED EMBODIMENTS

The present invention provides a portable and easy to use heat sealer. The heat sealer of the present invention is particularly useful for sealing rigid and semi-rigid plastic materials together. In one embodiment, the present invention is employed as a tabletop apparatus into which clamshell packages are feed to be sealed. The present invention provides a repeatable weld without the expense and danger associated with RF welders. In addition the present invention provide repeatable operational parameters. The operational parameters preferably include sealing temperature, pressure, time of heat application and tool withdrawing effects. The present invention can also be adapted to provide multiple welds simultaneously. Advantageously, the present invention provides hands-free operation, which removes operator error and operator injuries from the sealing process.

The present invention will now be described in terms of a table-top heat sealing or welding device; however, the present invention show not be construed as limited to the illustrative example and may be employed in other configurations with other features.

Figure 1:
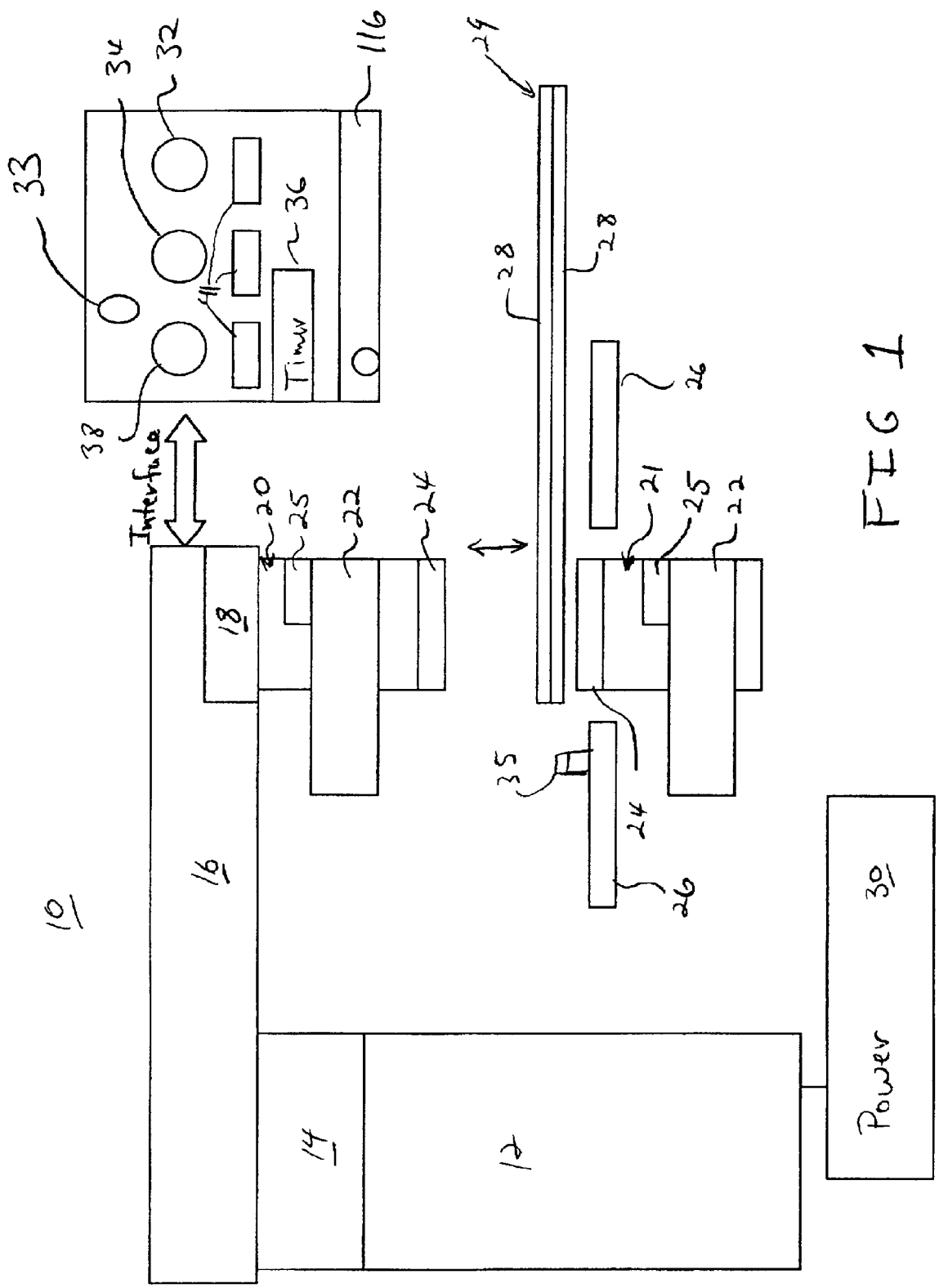
FIG. 1 is a side view showing a heat sealer in accordance with one embodiment of the present invention.

Referring now in specific detail to the drawings in which like reference numerals identify similar or identical elements throughout the several views, and initially to FIG. 1, a thermal sealer 10 for plastic packages is shown in accordance with one embodiment of the present invention. Sealer 10 includes a set of jaws 20 and 21, which are actuated to engage a clamshell package or bag 29. Clamshell package 29 includes two layers 28 of a plastic material which are to be welded together. Plastic layers 28 may include, for example, polystyrene, PVC or other plastics. Sealer 10 may be adjusted to adapt to other plastic materials as well.

Jaw 20 is capable of being actuated by and actuator 12. Actuator 12 may include a solenoid device, a stepper motor, hydraulic or pneumatic piston-cylinder or any other device which imparts a predetermined displacement to jaw 20. Actuator 12 is provided with a feedback signal from a pressure sensor 18. Pressure sensor 18 measures a pressure in jaw 20 against layers 28 and jaw 21 during the sealing process. In this way, the pressure during the welding or sealing process is known and can be controlled. Sensor 18 sends feedback to a pressure regulator 14. Pressure regulator 14 adjusts power from a power source 30 to appropriately adjust the pressure at jaws 20 and 21. Power source 30 energizes actuator 12 to provide motion and force to jaws 20 and 21. Power source 30 preferably includes an AC power source, but DC power or other power sources may also be employed.

Power source 30 also provides power to heating elements 22. Heating elements 22 provide heat energy to jaws 20 and 21. Heating elements 22 are preferably controlled by employing feedback from temperature measurement devices 25 for example, thermocouples or other temperature measurement devices(e.g., RTD's). Temperature measurement devices 25 measure the temperature of jaws 20 and 21 at appropriate locations to ensure proper melting of plastic to perform a weld. Devices 25 are set by a user control 32 to provide a temperature sufficient to melt and weld layers 28.

Pressure regulator 14 works in a similar way as heating elements 22. Pressure is sensed by pressure sensor 18 and compared to a set point. The set point is adjusted and set by a user control 34. Power to actuator 12 is adjusted up or down to attempt to achieve the desired pressure.

A timing device 36 is preferably included to also control pressure regulator 14 and/or actuator 12. Timing device 36 preferably includes a programmable semiconductor chip or other electronic circuit which measures an amount of elapsed time between events. For example, timing circuit 36 measures an amount of time after jaws 20 and 21 contact layers 28 to a set point set by a user employing a timing control 38. The user sets the amount of time needed to create a weld, and jaws 20 and 21 remain in contact with layers 28 for that period of time. The period of time needed may be set by a user based on experience or trial-and-error to achieve a suitable weld. Temperature control 32, pressure control 34 and timer control 38 are preferably solid-state controls, which each include a display 41 (e.g., LED display) or readout to permit a user to appropriately set these controls. Each package (e.g., layers 28) will have a preferred setting combination based on the thickness, material and strength requirements of the weld. These parameters may be set in accordance with predetermined criteria or based on visual inspections of previously formed welds. The present invention incorporates the principles of heat, pressure and time to provide a consistent, repeatable weld when melting the two or more layers of plastic. Operation includes setting the proper temperature, pressure and/or time to seal a particular clamshell package. These parameters may differ due to differing thickness of material and the particular materials to be sealed.

Sealing jaws 20 and 21 are removable and replaceable for different size requirements of welds. In accordance with the present invention, multiple sets of jaws maybe utilized simultaneously. The multiple sets of jaws may be movable and adjustable to different positions relative to each other for placement to particular packaging requirements. In this way, multiple welds may be provided and different locations on the packaging.

In accordance with the present invention, sealing areas on jaws 20 and 21 will be coated with a non-stick material 24, such as TEFLON or other non-stick materials to prevent molten plastic material from sticking to jaws 20 and 21. Material 24 is preferably thin to ensure sufficient thermal conductivity for heat from heaters 22 through jaws 20 and 21, which are preferably metallic.

A platform 26 is provided as a guide for feeding in layers 28 for sealing/welding. Platform 26 also provides a resting place for the package during the sealing process.

A switch 33 is employed to turn device 10 on or off. Switch 33 maybe a toggle switch or the like and may include multiple settings. Switch 33 may also be employed as a manual trigger for closing jaws 20 and 21. A sensor 35 may be employed as an automatic trigger for closing jaws instead of or in addition to manual switch 33. Sensor 35 is a position-sensing device to sense the position of package 29. Sensor 35 may be activated by employing light or by employing mechanical displacement of the sensor device.

Figure 2:
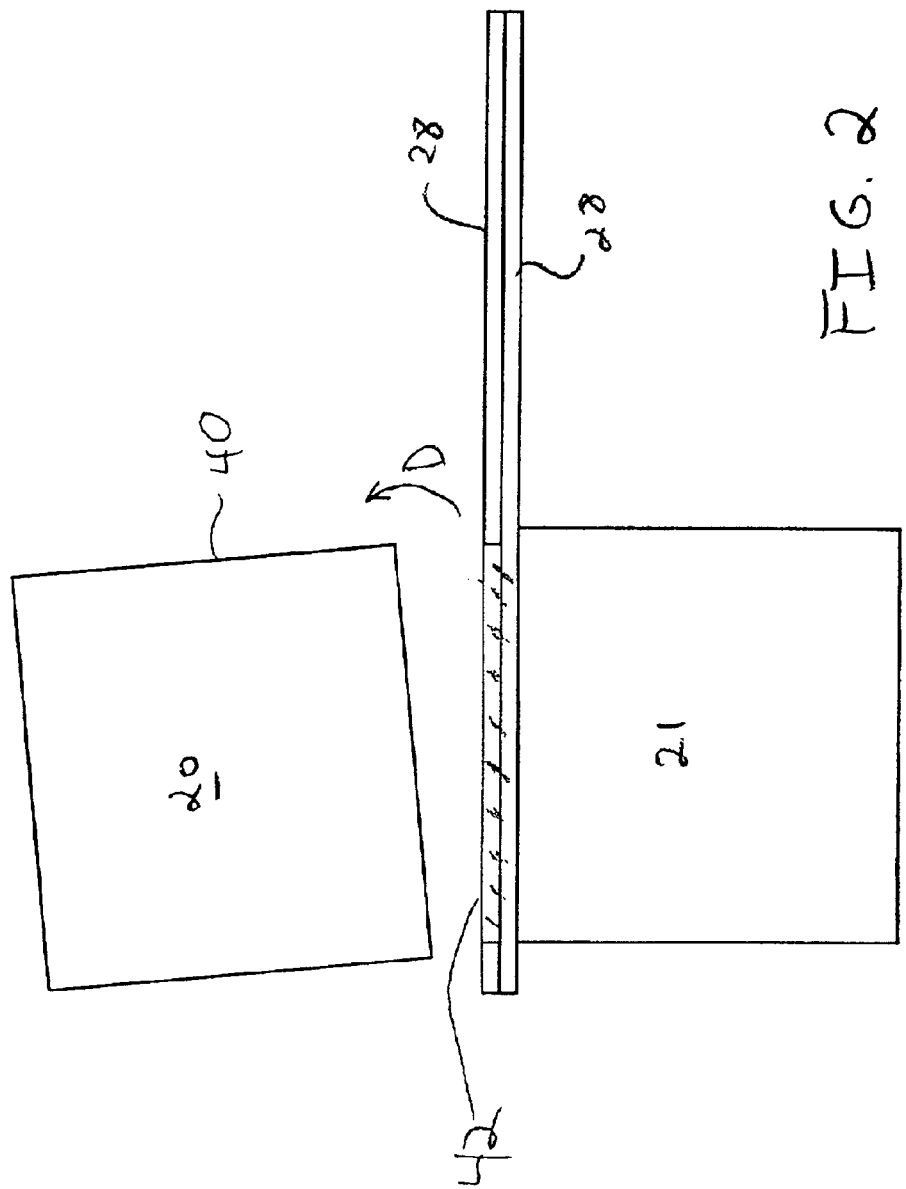
FIG. 2 shows jaws being separated from a workpiece with simultaneous translational and angular displacements in accordance with another embodiment of the present invention.

Referring to FIG. 2, in one embodiment of the present invention, jaw 20 is withdrawn from jaw 21 while simultaneously displacing jaw 20 angularly in the direction of arrow "D". Side 40 is removed from contact with layers 28 after forming a weld or seal 42. This motion of jaw 20 helps in ensuring that layers 28 are not drawn apart by the removal of jaw 20 after welding. The motion of jaw 20 may be provided by a plurality of different mechanism. These mechanism may include levers or four bar mechanisms which provide the needed angular and linear displacements as shown in FIG. 2.

Referring to FIGS. 3A–C, some illustrative weld or sealing patterns are shown to further demonstrate the capabilities of the present invention. Plastic layers 28 are shown on top of each other having welds or seals 44 formed therebetween. Welds 44 represent multiple locations where jaws 20 and 21 (FIG. 1) were simultaneously contacted on layers 28 to form multiple weld points to close package 29.

Package 29 is fed into sealing device 10. Multiple sets of jaws 20 and 21 (FIG. 1) have been configured to provide a pattern of welds to seal package 46 in accordance with specific packaging requirements. Sealer 10 may also be adapted form sealing plastic bags, inflatable toys or the like. FIG. 3D shows a plastic bag sealing pattern 48, which extends the entire length of bag 50.

Figure 4:
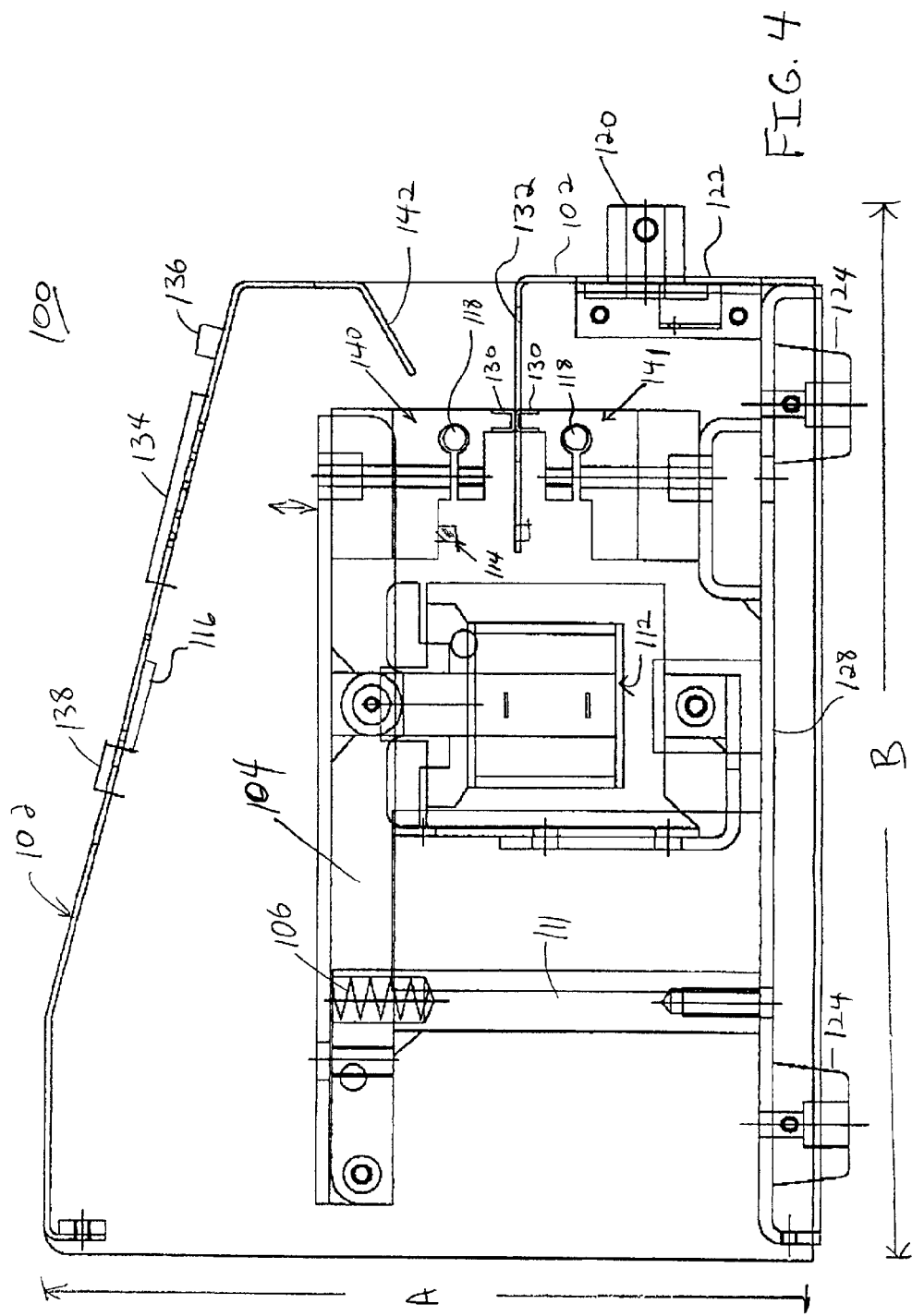
FIG. 4 is a side-cutaway view of a sealer in accordance with another embodiment of the present invention.

Referring to FIG. 4, a cut-away side view of a tabletop sealer 100 is shown in accordance with one embodiment of the present invention. Sealer 100 includes a cover or casing 102 which may include one or more molded plastic parts, sheet metal parts, etc.

Casing 102 provides a platform for mounting one or more displays 134, on/off power switch 138 and dials or controls 136. Casing 102 may be configured to provide a guide 142, which works in conjunction with platform 132 to guide an end of a package, such as a plastic clamshell package or plastic bag. Casing 102 may include face-mounted controls 120 122 as well. Control 120 may preferably be provided to adjust temperature of heaters 118 or pressure provided by solenoid 112.

Jaws 140 and 141 (shown in FIG. 4 in a closed or contact position) are capable of vertical motion relative to each other. In one embodiment, a lower jaw 141 is fixed and upper jaw 140 is moveable by employing a support 104, which is connected to solenoid 112. A guide rod 111 is employed to assist in making the appropriate upward and downward motion of jaw 140. Guide rod 111 is biased by, for example, a spring 106 to provide return motion. When activated, solenoid 112 opens jaws 140 and 141 by moving support 104. When deactivated, solenoid 112 closes jaws 140 and 141 to engage and seal a workpiece, such as clamshell package. Other mechanisms for causing relative motion between jaws 140 and 141 are also contemplated. For example, both jaws 140 and 141 may be configured to move relative to each other. In addition, solenoid 112 may be activated to seal the workpiece and deactivated to retract the jaws.

Solenoid 112 may be replaced with other actuators depending on application or requirements. For example, a pneumatic piston/cylinder assembly, a hydraulic piston/cylinder assembly, a piezo-electric actuator or other displacement device may be employed. Solenoid or actuator 112 may be activated by a manual switch 138 or by a sensor 114. Sensor 114 may include a light source/sensor device such that a light beam is altered therebetween when a workpiece is fed into device 100. Actuator 112 is then switch-activated to close on the workpiece. In this way when a workpiece is fed deep enough into sealer 100, jaws 140 and 141 close automatically on the workpiece. Sensor 114 may also include a mechanical trigger, a capacitance-measuring device or other type of sensor, which will repeatably and reliably cause the jaws to close on a workpiece.

Jaws 140 and 141 preferably include a highly conductive material, e.g., a metal, which is configured to receive heaters 118. Heaters 118 are preferably resistance heaters although other types of heaters may be employed. Heaters 118 are controlled to provide the appropriate sealing temperature for a particular workpiece. Contact surfaces of jaws 140 and 141 are preferably lined with a non-stick material 130, as described above. Jaws 140 and 141 may be removed from the unit and replaced with jaws of other configurations.

In one embodiment, sealer 100 may include a memory device 116. Memory device 116 stores a plurality of parameter settings for a plurality of different packages. If a packages operation includes multiple different packages, memory 116 stores the parameter settings for each. For example, an operator seals a first package with setting #1 and a second package with setting #2. Memory 116 remembers and adjusts time temperature and pressure settings according to the set points in the memory.

Preferred embodiments of the present invention are lightweight and portable. Sealer 100 may include legs or mounting stands 124 mounted on a base 128 for a tabletop set-up or for mounting sealer 100 in another manufacturing/packing machine. Casing 100 may include side handles (not shown) or the like to assist in carrying sealer 100 from location to location.

It is to be understood that casing 102 isolates jaws 140 and 141 and the elevated temperature of jaws 140 and 141 from the operator. This creates a safer work environment. In addition, the process of sealing the packages is a hands-free operation in accordance with the present invention; carpal tunnel syndrome injuries are no longer possible as a result of the sealing process.

Advantageously, sealer 100 is small in size. In one embodiment, dimension A is less than 7 inches, dimension B is less than 8.5 inches and the width (into and out of the plane of the page) is less than 9 inches. Smaller or larger dimensions can be achieved depending on the application.

Figure 5:
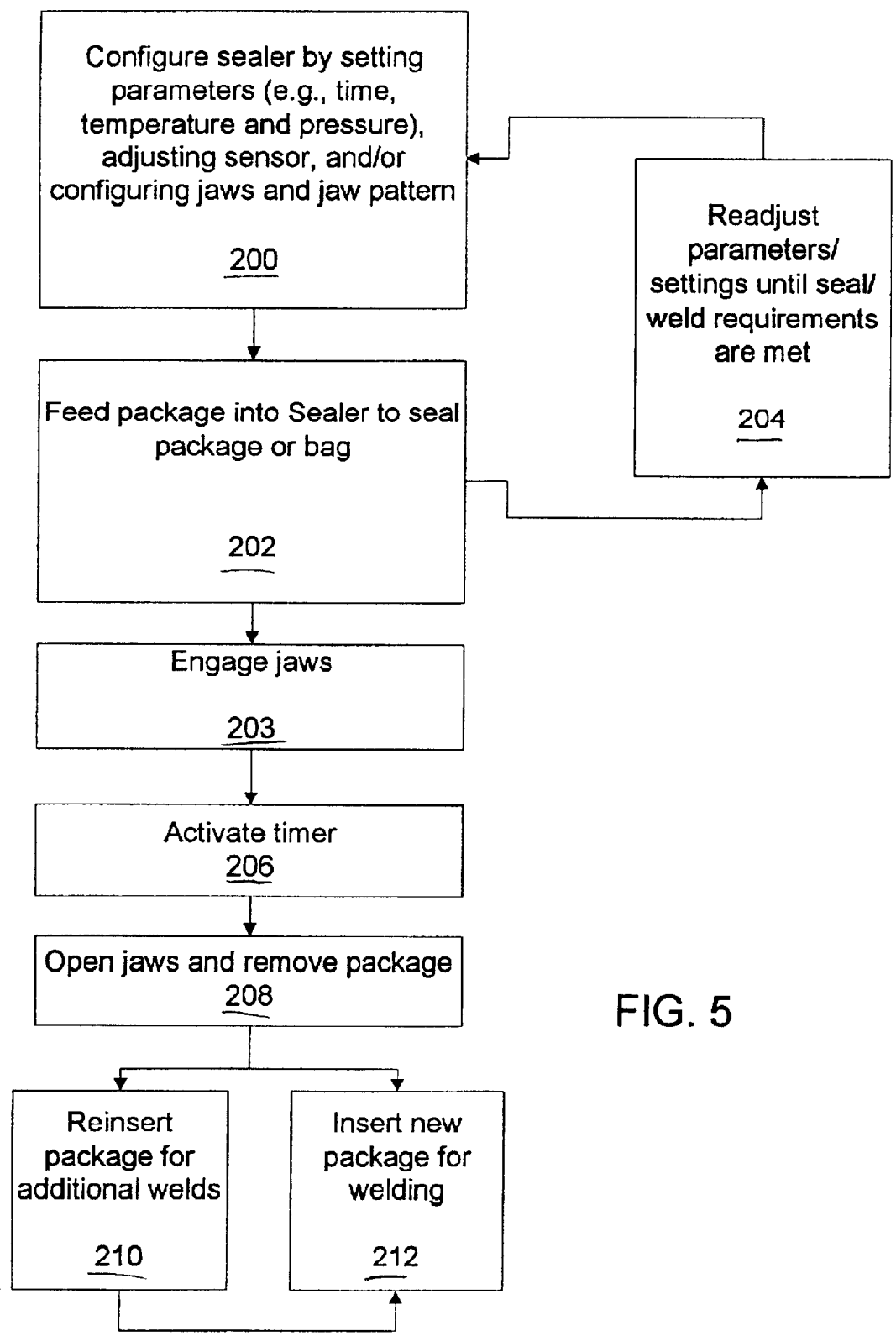
FIG. 5 is a block diagram showing a method for sealing a clamshell package or bag in accordance with the present invention.

Referring to FIG. 5, a flow diagram shows a sequence of operations to seal a package or bag in accordance with the present invention. In block 200, a sealer is configured for a seal pattern (see, e.g., FIGS. 3A–D). This may include changing the jaws, adjusting temperature, pressure and time set points and or adjusting the sensor to trigger the jaws. In block 202, an operator places a product(s) in the sealer to seal a package or bag. The operator presents one side of the package to be sealed into the machine as far as the package will feed. The sensor will be activated that will energize an actuator (e.g., a solenoid) to bring the sealing jaws down to the product to be sealed. This may be performed initially as a test or continue as part of a production run. During testing the package is observed to ensure requirements are met. Otherwise, in block 204, adjustments are made to the parameters until a quality package seal/weld is achieved.

As soon as the jaws close, a timer is activated, in block 206, which controls the time needed to weld the package material. The timer is manually set, and depends on the thickness of the material and the type of plastic to be welded. The jaws will open and operator will remove package, in block 208.

The operator may then either reinsert the package to place additional welds on the same package, as needed, (block 210) or place a new package to be welded (block 212). In block 214, the package will be left undisturbed while the plastic returns to ambient temperature. Sealing is completed.

Having described preferred embodiments for heat sealer (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A sealer comprising:
   a base configured to be mounted on a tabletop;
   a first jaw connected to the base;
   a second jaw operatively aligned with the first jaw, the first and second jaws being removable and configurable to permit different jaw configurations;
   an actuator coupled to the second jaw to provide relative motion with respect to the first jaw; and
   a heating device coupled to the first and second jaws for heating the jaws to a set temperature to enable a layered material to be welded together when the heated first and second jaws are in a closed position to contact the layered material.

2. The sealer as recited in claim 1, wherein the first jaw and the second jaw include a non-stick liner.

3. The sealer as recited in claim 1, wherein the actuator is coupled to a guide rod to provide a controlled displacement between the first jaw and the second jaw.

4. The sealer as recited in claim 1, further comprising a timing device which measures a time in which the first and second jaws are in the closed position.

5. The sealer as recited in claim 1, further comprising a pressure sensor which measures the pressure and adjusts the actuator accordingly.

6. The sealer as recited in claim 1, wherein the heating device is controlled by feedback from a temperature measurement device.

7. The sealer as recited in claim 1, further comprising a sensor operatively positioned relative to the first jaw and the second jaw to sense a position of a workpiece relative to the first and second jaws.

8. The sealer as recited in claim 7, wherein the sensor triggers the actuator to close the first and second jaws.

9. The sealer as recited in claim 1, further comprising a casing, the casing dimension and configured to enclose the first jaw and the second jaw and the heating device for operator safety.

10. The sealer as recited in claim 1, wherein the casing includes a guide which enables a workpiece to be aligned with and disposed between the first and second jaws.

11. The sealer as recited in claim 1, further comprising a memory which stores a plurality of settings combinations for different workpieces.

12. The sealer as recited in claim 1, wherein the actuator is coupled to a mechanism which simultaneously provides a rotational and translational motion to the first jaw.

13. A heat sealer for clamshell packages, comprising:
   a base configured to be mounted on a tabletop;
   a first jaw connected to the base;
   a second jaw operatively aligned with the first jaw, the first and second jaws being removable and configurable to permit multiple sets of jaws to be used simultaneously;
   an actuator coupled to the second jaw to provide relative motion with respect to the first jaw;
   a heating device coupled to the first and second jaws for heating the jaws to a set temperature to enable a layered plastic material to be welded together when the heated first and second jaws are in a closed position to contact the layered plastic material; and a casing coupled to the base and enclosing at least the first and second jaws and the heating device to prevent casual operator contact with the first and second jaws and the heating device.

14. The sealer as recited in claim 13, wherein the first jaw and the second jaw include a non-stick liner.

15. The sealer as recited in claim 13, wherein the actuator is coupled to a guide rod to provide a controlled displacement between the first jaw and the second jaw.

16. The sealer as recited in claim 13, further comprising a timing device which measures a time in which the first and second jaws are in the closed position.

17. The sealer as recited in claim 13, further comprising a pressure sensor which measures the pressure and adjusts the actuator accordingly.

18. The sealer as recited in claim 13, wherein the heating device is controlled by feedback from a temperature measurement device.

19. The sealer as recited in claim 13, further comprising a sensor operatively positioned relative to the first jaw and the second jaw to sense a position of a clamshell package relative to the first and second jaws.

20. The sealer as recited in claim 19, wherein the sensor triggers the actuator to close the first and second jaws.

21. The sealer as recited in claim 1, wherein the casing includes a guide which enables a clamshell package to be aligned with and disposed between the first and second jaws.

22. The sealer as recited in claim 13, further comprising a memory which stores a plurality of settings combinations for different clamshell packages.

23. The sealer as recited in claim 13, wherein the actuator is coupled to a mechanism which simultaneously provides a rotational and translational motion to the first jaw.

24. A method for sealing a package, comprising the steps of:
configuring a heat sealer by adjusting at least one of temperature, pressure and engagement time of a first and a second jaw, the first and second jaws being removable and configurable to permit multiple sets of jaws to be used simultaneously;
placing the package in the sealer by presenting layers of the package to be sealed into the sealer; and
closing the jaws of the sealer to enable the layers of the package to be contacted and welded in a hands-free weld operation.

25. The method as recited in claim 24, further comprising the step of adjusting a trigger sensor, which triggers the jaws to close.

26. The sealer of claim 1, wherein the layered material comprises a plastic layered material.

27. The method of claim 24, wherein the layers of the package comprise plastic layers.

28. The sealer as recited in claim 1, wherein the sealer includes a single set of jaws.

29. The sealer as recited in claim 1, further comprising multiple sets of jaws placed at different positions relative to each other to provide multiple welds simultaneously at different locations on packaging.

30. The sealer as recited in claim 13, wherein the sealer includes a single set of jaws.

31. The sealer as recited in claim 1, further comprising multiple sets of jaws placed at different positions relative to each other to provide multiple welds simultaneously at different locations on packaging.

* * * * *